2,988,535
CURING OF EPOXIDE RESINS

Robert B. Feuchtbaum, Glen Oaks, and Donald L. Hinson, Bayside, N.Y., assignors to Freed Transformer Co., Inc., Brooklyn, N.Y., a corporation of New York
No Drawing. Filed Dec. 21, 1955, Ser. No. 554,416
19 Claims. (Cl. 260—47)

This invention is an improved thermosetting epoxide resin, characterized in the fully polymerized state by high dielectric strength, high mechanical strength, high temperature and moisture resistance, and other valuable properties; an improved mixed curing agent for an epoxide resin; and a process, used in the foregoing but of wider application as well, by which a class of organic materials are made effective, or more effective if already so, as curing agents for epoxide resins.

The optimum forms of the improved thermosetting epoxide resin product are capable of maintaining their excellent physical and electrical properties at temperatures of 200° C. and higher. The product is useful especially as a potting or casting compound for encapsulating transformers and other electrical components. It involves essentially a system consisting of (1) an epoxide resin of the kind exemplified by the polyether condensation product of a polyhydric phenol and epichlorohydrin; and (2) a mixed curing agent in the form of a solvated association product of certain aromatic hetero-polyfunctional amphoteric compound and an aromatic amino compound which is not an amphoteric substance, both of these components being compounds which melt without decomposition.

Representative and preferred epoxide resins for use in making this product are the commercial resins identified as Epon 828 of Shell Chemical Corporation, Araldite 6010 of Ciba Company and Bakelite 18774 and 18794 of Bakelite Company, division of Union Carbide & Carbon Corporation.

Representative and preferred compounds for use in the mixed curing agent are anthranilic acid or 2-aminobenzenethiol as the aromatic hetero-polyfunctional amphoteric compound, and a phenylenediamine (o, m or p) as the aromatic amine. The mixed curing agent, preferably but not necessarily made up in advance of its addition to the resin, is a novel association product which in itself has advantages in stability, ease of preparation and convenience of use, quite apart from its special efficacy in the cure of the resin.

By a "hetero-polyfunctional amphoteric" substance we mean one which is capable of forming salts with either acids or bases (i.e., is amphoteric), and which moreover is so because of having in the molecule at least one functional group that is acidic and at least one functional group (other than the first) that is basic; the word "hetero" being used to express the idea that there are separate groups of opposite character in this respect. An example is anthranilic acid (o-amino benzoic acid), having a carboxyl group and an amino group and a melting point, without decomposition, of 144° C.

The product may also include fillers, copolymers, plasticizers, flame retarders, or other modifiers. It cures to the infusible state of full polymerization in a time ranging from 5 or 10 minutes to 2 hours or longer, depending on the temperature which may be from 100° C. or lower to 200° C. or somewhat higher, a lower temperature requiring a longer time. No catalyst, initiator, accelerator or regulator of the polymerization reaction is needed, but such may be used. A catalyst such as pyridine may be used in concentrations of 1% or less to shorten the cure, especially at the lower temperatures.

We have not as yet found a full explanation of the superior thermosetting epoxide product obtained with our mixed curing agent. A partial explanation is believed to be this. In these polyfunctional amphoteric substances there is an electrical attractive force between an acidic functional group and a separate basic functional group of any one molecule, and also between the oppositely characterized groups of adjoining molecules. When such a substance is used alone as a curing agent for an epoxide resin, its molecules orient themselves and form complexes in a way that partially blocks the access of their functional groups to the epoxy groups of the resin, with which they are intrinsically capable of establishing cross links or branch links or both. The molecules may be pictured as forming complexes in which the functional groups of the component amphoteric molecules are predominantly at the interior and confront one another, with non-reactive groups confronting the epoxy groups. But when admixed with an aromatic amine, which is not of the hetero-polyfunctional variety, a differently oriented complex is formed by an association involving loose bonds or other forces between the amine molecules and the molecules of the polyfunctional amphoteric substance. This different form of complex gives an orientation of the molecules of the amphoteric substance in which its functional groups are directed in a way to make them more accessible to the epoxy groups of the resin and therefore more effectively available to form cross links or branch links.

Presumably the non-amphoteric amine participates also to some degree in establishing linkages with the epoxy groups; but here it serves the additional purpose of so associating with the polyfunctional amphoteric substance as to orient it more favorably from the standpoint of epoxy linkage. The indication is that the non-amphoteric amine of the mixed curing agent is modified in its cross-linking action as compared with the case of its use alone, since the mixed curing agent in general gives a slower cure than does the same amine alone, indicating an inhibition of its normal action. The over-all effect of the mixed curing agent is however better than that of the amine alone, showing that the resulting macromolecular structure is different and that the amine itself figures in it in a different way. Further, with the mixed agent, practical cures can be effected at higher temperatures without bubbling or frothing than with the same amine alone, indicating a lower exotherm and a different reaction mechanism.

The precise nature of the linkages that are established is not known, but it is empirically evident that a superior geometrical configuration is created in the macromolecule and that the effect of the mixed curing agent is synergistic as respects the effects of its two components upon the resulting macromolecular structure. Thus, using 2-aminobenzenethiol or anthranilic acid alone as a curing agent, an epoxide resin of the sort described can be cured to an infusible state, but the product is brittle. The cure is relatively slow. Using metaphenylenediamine alone as a curing agent for the same resin, a more rapid cure is effected to a less brittle product, but the product is deficient in mechanical strength, temperature resistance and electrical properties. A cure of the same resin with the mixed curing agent yields in relatively short time an infusible product that is markedly superior to the product of either component of the mixture when used alone, and that is indicative of a molecular structure different from that obtained with either curing agent alone. For example, where a product cured with either 2-aminobenzenethiol alone or metaphenylenediamine alone has an impact strength below 0.4 foot pound per inch notch (Charpy test), a product cured at 150° C. with a preferred liquid mixture of these two agents has an impact strength of over 0.8 foot pound per inch notch.

That there is an association between the amine and the hetero-polyfunctional amphoteric substance is shown by the very marked solvation effect of their mixture. Thus, 2-aminobenzenethiol melts at 23° C. and metaphenylenediamine melts at 62° C. When the diamine is melted, mixed in proper proportion with the amphoteric, and the mix is cooled, it remains a liquid at room temperature. The same is true of anthranilic acid (M.P. 144° C.) when mixed with metaphenylenediamine or any of several other aromatic amines of not too high melting point. With less favorable proportions, and also in the cases where either or both components of the mixed curing agent are of high melting point, the mixture obtained by melting the two together is not liquid at room temperature but melts at a reduced temperature within the range of easy working conditions and of practical curing.

Thus, in all cases the mixed curing agent has advantages in these several respects. It is easily prepared. Being liquid or liquefiable at a relatively low temperature, well below the melting point of its higher melting component or of both components, it can be thoroughly dispersed in admixture with the resin to be polymerized, giving a homogeneous reaction mass conducive to more uniform and more thorough reaction. Further, in the cure, the molecules of the amphoteric substance are oriented in a way more favorable to the establishment of linkages with the epoxy groups of the resin, and markedly improved cured products are obtained as compared with those obtainable with either of the component substances as a sole curing agent. Finally, a number of amphoteric substances are made practically available as curing agents which otherwise are not so because of their high melting points and consequent difficulty of dispersion in the reaction mass with the resin.

The procedure for curing an epoxide resin with this mixed curing agent follows conventional lines and requires no special conditions or apparatus. The amount of the mixed curent agent used is preferably that which is in stoichiometric relation to the amount of epoxide resin, but good results can be obtained with amounts of the mixed curing agent as low as about 80% of the stoichiometric amount. Amounts exceeding the stoichiometric by more than 5% are undesirable. Greater variation either way results in an impairment of the product—so great as to make it undesirable. Preferably the curing agent is pre-mixed, since it is highly stable, can be stored for several months, and is either liquid or liquefiable at a practical working temperature; and since it is simpler to add a single material to the resin. However, its advantageous effects in the cure itself can be obtained by mixing the three materials at one time, i.e., the resin, the amphoteric material and the non-amphoteric amine, with heating to melt the high melting substances and thereby form the liquid association product in situ. It is possible also to prepare the resin in situ; but the preferable procedure is to prepare it in advance or to procure it as a prepared material of commerce such as the resins identified above.

The ternary mixture, including the resin, is somewhat stable at room temperature. Its pot life is of the order of two hours when kept at 25° C. or below, so that it can be made up as a pre-mixed material permitting some leeway before the curing step. In 500 gram batches, it cures at room temperature (20° C.) to a "B" stage (fusible glass state) in 5 to 8 hours. The active full cure, effected within practical time limits, can be initiated by heating to around 60° C., or to any higher temperature short of that of excessive decomposition or vaporization of any of the reactants; and proceeds at an economically feasible rate even without a catalyst if the chosen temperature is sufficiently high. Initiators and accelerators of known types may be used for practical curing initiated at room temperature or at low temperature. For example, using a catalyst consisting of pyridine and a polyhydric organic compound such as glycerine or resorcinol, a cure is initiated at room temperature and in batches of 250 grams or more is complete in about 15 minutes, the temperature rising during the cure because of the increased exotherm.

A cure, without a catalyst, at 200° C. in from 5 to 10 minutes gives a product equal to that produced by a 2 hours cure with metaphenylenediamine at 135° C. or 140° C., which is the highest temperature feasible with the amine alone if bubbling is to be avoided. A longer cure with our mixed curing agent, at a lower temperature, gives a better product than can be obtained in any length of cure with agents heretofore known to us. A cure of our system at 150° C. in an hour or less gives an excellent combination of efficiency and superiority of product. In general, cure at 125° to 150° is preferred. Where time permits, a full cure at 90° C. in ten hours yields a good product. Where the resin is to be used with embedded metal parts, of different coefficient of expansion from that of the resin, less strain is produced when the product is in use if the cure is at or close to the mean of the temperatures most frequently encountered in use.

Our ternary system gives at the "B" stage a fusible product having a shelf-life of six months or longer if kept at temperatures below about 20° C. This "B" stage product is brittle, but because it can be ground readily to a powder, it is useful as a compression molding product where the cure is completed by heat in the molding step. It is soluble in solvents such as ketones, nitroparaffines and the like; and in such solution it is an improved material for use as a low-pressure molding resin for reinforced plastics or for coating, insulating and impregnating, as well as for adhesives requiring temperature resistance up to 200° C.

The unique nature of the molecular structure established by our liquid mixed curing agent is further shown by the behavior of this "B" stage product. For example, the amphoteric substances of the present invention, if used alone as curing agents, give in time a fusible "B" stage glassy product, but the product then cures to an infusible state in such a long time (several hours) as to make it impractical for contact molding and like uses of fusible "B" stage resins. The non-amphoteric aromatic amines, if used alone, give fusible "B" stage products more rapidly, but the products have such a short shelf life as to make them undesirable for such uses. Our 'B" stage product overcomes both disadvantages in that it has a long shelf life and yet, upon heating, cures rapidly to the infusible state. Further, our "B" stage product has a relatively sharp melting point (around 80° C.) and melts to a highly mobile state making it advantageous in its use in molding processes. It remains liquid for several minutes at the relatively low temperatures at which it melts, and its conversion to the infusible state occurs sharply.

These properties of the system by which, as the cure proceeds, it converts quickly to a mobile state, retains that state for a relatively long time, and then quickly thickens, are of advantage also in effecting a full cure in a single operation, since the mobility of the mass during a longer fraction of the reaction period is conducive to greater homogeneity and more uniform linkages, through avoidance of temperature differences within the mass, and also is conducive to the release of gases which if entrapped would impair the final product.

We further define or exemplify as follows the classes of materials which are useful in preparing a thermosetting product in accordance with the foregoing.

The class of epoxide resins consists of those monomeric or polymeric polymerizable ethoxyline compounds which are polyether derivatives of polyhydric alcohols or of polyhydric phenols having at least two phenolic hydroxy groups, which have an epoxy equivalency of 1.4 or higher, and in which any reactive functional centers other than hydroxy and epoxy groups are either absent, as in the present commercial forms of these resins, or in any event are noninterfering with respect to the curing reactions. The ethereal oxygen is not regarded as a functional center.

As is well known in this art, such resins are commonly a mixture of related but somewhat different molecular species, although predominantly composed of a species having two or more epoxy groups. Hence the figure for epoxy equivalence is not an integer and represents the average number of epoxy groups per mol. (cf., U.S. Patents 2,444,333, 2,500,600, 2,528,932, 2,548,447, 2,553,718, 2,681,901, 2,682,515, 2,707,177, which also describe certain known methods of preparing and curing such resins). Commercial resins presently available commonly have an epoxy equivalence less than 2, but triepoxides and even higher forms are possible and are contemplated for use in our invention.

The preferred resins of the described class are those in which the content of hydroxy groups is low, and of the order of less than 10%. We prefer also the resins which are of low melting point, and are either at least syrupy at room temperature or are liquid at some temperature below about 125° C. to permit ready and thorough admixture with our mixed curing agent. However, we can use resins having melting points up to about 175° C., either alone or mixed with lower melting epoxide resins. Commercial resin identified as Epon 1009, having a melting point of 145–155° C., is an example of such a resin.

The useful aromatic amphoteric substances have the general formula X—R—Y in which X is one or more basic functional centers or groups, Y is one or more separate acidic functional groups, and R is an aromatic nucleus, with or without other non-interfering substituents. The nucleus R is either a single carbon ring, a single heterocyclic ring or a plural ring structure of fused, linked or bridged rings composed of either carbon rings or heterocyclic rings or both. Preferably this aromatic nucleus R has no more than 18 cyclically included carbon atoms, and preferably has an equivalent weight not exceeding about 250.

More particularly, the acidic functional group Y is either a sulfhydril ("mercapto"; "thiol") group (—SH), or a carboxyl group (—COOH), and is attached to a ring carbon either directly or through a lower alkyl group having from 1 to 3 carbon atoms in a side chain or in a bridge between aromatic rings. The basic functional center or group X is either a basic ring nitrogen or a basic amino group which (1) has its nitrogen atom attached directly to a ring carbon, or (2) forms either a side chain or a bridge or a part of a bridge between aromatic rings, and (3) is either $NH_2$, $NHR_1$ or $NR_2R_3$, in which $R_1$, $R_2$ and $R_3$ may be the same or different lower alkyl groups having from 1 to 5 carbon atoms.

A basic group X and an acidic group Y may be cyclized provided that their respective and separate functionalities are retained, as in 2-mercaptobenzothiazole. Where there are more than one group of either character, the individual groups of any one character may be the same or different. In the case of compounds having fused, linked, or bridged rings, the acidic and basic groups may be associated with the same or with different constituent rings. Non-interfering substituents may be present at other points.

In the following statement of examples of such aromatic amphoteric substances, the name of each is followed by the figure for its melting point, which is a point at which it melts without decomposition:

(1) Benzene derivatives, such as the aminobenzoic acids, ortho (144° C.), meta (173–4° C.) and para (186° C.); 3,4,5-triaminothiophenol (liquid); 3,4,5-triaminobenzoic acid (100° C.); 2-aminobenzenethiol (23° C.).

(2) Pyridine derivatives, such as nicotinic acid (235° C.), picolinic acid (137–9° C.), isonicotinic acid (317° C.), dipicolinic acid (258–9° C.); dicarboxylic pyridines such as quinolinic acid (110° C.) and lutidinic acid (248–250° C.); isocinchomeronic acid (236–7° C.).

(3) Thiazolines such as 2-mercapto, 2-thiazoline (104–5° C.) and 2,4-thiazodidinedione (124–6° C.).

(4) Pyrrole derivatives such as pyrrole-alpha-carboxylic acid (192° C.).

(5) Pyrimidine derivatives such as 2,4-dimethoxy-6-pyrimidinethiol (liquid).

(6) Derivatives of condensed aromatic compounds (for example, indoles formed by fusion of a benzene ring and a pyrrole ring), such as 3-indoleacetic acid (166–8° C.), 3-indolebutyric acid (122–4° C.), or 3-indolepropionic acid (123° C.); 7-indole-carboxylic acid (198–9° C.); dioxindole (52–3° C.), 2-carboxy-1,3,4,5-tetrahydrobenzindole (176–7° C.); also derivatives of compounds formed by fusion of a pyridine ring and a benzene ring, such as 2-quinoline carboxylic acid (158° C.) and 6-quinoline carboxylic acid (287–9° C.), compounds formed by fusion of a benzene ring and a pyrazine ring, such as quinoxaline-2-thiol (204–5° C.); and compounds formed by fusion of a pyrimidine ring and a pyridine ring.

With respect to the aromatic amines, useful in our mixed curing agent as the non-amphoteric component, the choice is a wide one, limited only by the requirement that the amine be a primary or secondary amine and that it be capable of melting without decomposition. There is no limitation as to number of rings, arrangement of rings (fused or linked), or type of ring, whether a carbon ring or a heterocyclic ring. The useful class is indifferent to other non-interfering substituents present provided at least one functional amino group is retained. Halogenated and nitrated amines are included.

Good results have been obtained with: o, m, and p-phenylenediamine, dianisidine, m-tolylene-diamine, aniline, para para methylene dianiline, and o-tolidine. Other representative examples are: diphenyl amine; p-amino diphenyl amine; the toluidines; mono-methylaniline; 1,5-diamino naphthalene; metatoluidinediamine; melamine; anisidines; triaminobenzene; benzidines such as triaminodiphenyl; triaminotoluene; triaminotriphenylmethane [(o, p′, p″) (m, p′, p″) and (p, p′, p″)]; alpha and beta naphthylamine; and alpha and beta N-phenyl naphthylamine.

We prefer that the non-amphoteric aromatic amine, like the amphoteric substance, contain not more than 18 atoms in the ring structure itself, the cases involving more than 5 to 8 such atoms being those of the fused, bridged or linked ring structures. We prefer also that the equivalent weight be less than about 250.

As among mono-, di- and triamines, the choice is governed by these considerations which for most cases lead to a preference for the diamines. The monoamines have less hydrogen equivalency and therefore larger quantities are needed to effect solvation, but the pot life of the resulting mixed curing agent is longer. In the cure, they produce a product having the minimum degree of resistance to temperature and moisture. The triamines produce a maximum of cross-linkage in the cure, sometimes more than is desired because of the greater brittleness imparted to the product; but they impart a maximum of resistance to temperature and moisture. The diamines give an adequate pot life and in the cured product an often preferable combination of resistant properties without undue brittleness.

In the mixed curing agent, the proportions of aromatic amphoteric substance and non-amphoteric aromatic amine range from about 10 to 90% by weight of either, i.e., the compositions range from 10–90 to 90–10. The preferred range is from about 25% to about 75% of each, giving compositions from 25–75 to 75–25. The time required for cure is somewhat longer with the mixtures having the lower contents of non-amphoteric amine.

In the preferred range from 75–25 mixtures to 25–75 mixtures, the mixed curing agent when used in stoichiometric amount is capable of curing the resin to a product very substantially better than can be obtained by the use of a stoichiometric amount of either of its components alone. In those cases where the mixture is capable of being liquid at room temperature, we prefer proportions in which the whole mixture remains liquid and none of the higher melting component precipitates. The melting point of the mixture tends to be higher as either or both components are of higher melting point. In general, the mixed curing agent is easier to prepare and to work with when at least one component is a liquid or low melting solid and when the higher melting component is present in lesser amount than the liquid or lower melting component. When both components are of high melting point, there still is the advantage that the mixture melts at a lower temperature than the melting points of the components, which makes it easier to work with than if either component were used alone, plus the improvement in the cured product; but the ease of preparation and working is not as great as when either or both components are of lower melting point.

As already stated, no catalyst is needed but one may be used. A smaller quantity is used than is commonly required. Thus, pyridine in amount under 1% causes the cure to be completed in a shorter time or at a lower temperature. Its use is desirable also in imparting a deep red color to the cured product in the case of such mixtures as 2-aminobenzenethiol and a phenylenediamine. This unusual effect, together with the fact that so little pyridine has a strong catalytic effect, again show that the polymerization reaction with our mixed curing agent proceeds differently and yields a different macromolecular structure than when either component of the mixed agent is used alone as a curing agent.

EXAMPLE 1

A liquid mixed curing agent is prepared with 100 parts (by weight, here and elsewhere) of 2-aminobenzenethiol (orthoaminothiophenol) and 54 parts of metaphenylenediamine by first vacuum distilling the materials to remove volatile impurities, and then melting the diamine (M.P., 62° C.) and adding the amphoteric substance to it, with mild agitation, the heat of the melted diamine being enough to liquefy this particular amphoteric substance (M.P., 23° C.). When cooled to room temperature, or even as low as −3° C., the mixture remains liquid. It is a stable mixture having a shelf life of more than six months. The stated proportions are preferred, but others may be used within the range already given, with only the incident that if more of the amine is present than in the above, some of it may precipitate out and require mild heating of the mixture to restore the whole to a liquid state. A useful alternative to the above is a ratio of 145 parts of the amphoteric substance to 115 parts of the stated diamine, the mixture at room temperature being just short of precipitation.

EXAMPLE 2

Using materials similarly purified by vacuum distillation as in Example 1, a liquid mixed curing agent is prepared by melting anthranilic acid (M.P. 144° C.) and metaphenylenediamine, and mixing them with mild agitation while liquid, using 100 parts of anthranilic acid and 100 parts of the diamine. Again the mixture remains liquid at room temperature and has a shelf life of several months.

Other proportions may be used within the same limits (90–10 and 10–90) as with 2-aminobenzenethiol of Example 1. A mixture of 14.3 parts of metaphenylenediamine and 1.6 part of anthranilic acid is liquid. A mixture of the same in the proportion of 2.3 parts of the diamine to 20.7 parts of the amphoteric substance is a solid melting at about 60° C.

EXAMPLE 3

Using 30 parts of nicotinic acid (M.P. 235° C.) and 70 parts of metaphenylenediamine, a mixed curing agent was prepared by dissolving the nicotinic acid in the melted diamine. The mixture solidified at room temperature but liquefied upon heating to about 90° C., which is a temperature within the range of practical working conditions, whereas use of the nicotinic acid alone would entail difficulties because of its high melting point, and could be regarded as impracticable. This is an example of the desirability of the mixed curing agent when regarded solely from the standpoint of convenience in use.

EXAMPLE 4

19 parts of the liquid mixed curing agent of Example 1 were used in curing 100 parts of a commercially available epoxide resin identified as Epon 828 of Shell Chemical Corporation. These proportions were stoichiometric, in the usual sense of that term in this art. The resin and curing agent were mixed at room temperature, and after about 2 hours at that temperature showed only slight thickening. The mixture was then placed in an oven heated to 150° C. and automatically regulated to hold that temperature. A full cure was effected in 45 minutes. The cured product so made had a compressive strength of 40,000 pounds per square inch, as compared with 15,000 to 20,000 for conventional epoxide resin products; its impact strength (Charpy test, A.S.T.M. Specification No. D–256–47T) was 0.85 foot pound per inch of notch, as compared with from 0.2 to 0.5 for conventional epoxide resin products; it maintained its structural properties to 235° C. and its electrical properties to 200° C.; it was highly resistant to moisture, as evidenced by its maintenance of a dielectric strength in excess of 2,000,000 megohms for 240 hours in a 70° C. atmosphere having a relative humidity of 96%; and in addition, it was free from bubbles and voids, had good adhesion to metals, excellent dimensional stability (no creep, and shrinkage of only about 1%), and a tensile strength comparable with conventional epoxide resin products. Test results indicate that this material meets all requirements of government specification MIL–I–16923B.

EXAMPLE 5

The curing agent of Example 1 and the epoxy resin (Epon 828) of Example 4 were mixed in the same proportion as in Example 4 and used to encapsulate an electric transformer, the cure being effected as in Example 4 but with the transformer contained within the reaction mass. The resulting encapsulated product showed the same excellent physical and electrical properties. Test results indicate that this encapsulated transformer meets all requirements of government specification MIL–T–27A, and does so at all temperatures between −55° C. and +200° C.

EXAMPLE 6

Using 19 parts of the liquid mixed curing agent of Example 1 and 100 parts of resin Epon 828 as before, cures were effected with embedded metal parts in different runs at temperatures of 90° C. and 180° C. The cure at 90° C. required 4 hours, and exemplified a cure with an embedded telemetering filter which in use is subject to temperature not exceeding 125° C. The cure at 180° C. required one-half hour and involved an embedded filament transformer which in use encounters temperatures of that order. In both cases, the products showed the same electrical properties and resistance to thermal shock that characterize the previously described product cured at 150° C., and met all requirements of government specifications, MIL–E–5400, MIL–T–27 and MIL–E–5422C.

EXAMPLE 7

The liquid curing agent of Example 1 was used in stoichiometric amount to cure other commercially available resins, namely, Araldite 6010 of Ciba Co. and Bakelite 18794 of Bakelite Co., division of Union Carbide and Carbon Corp. Cures of each were effected at 90° C., 150° C., 180° C. and 200° C. At any particular temperature of curing, the time of cure was substantially the same as with the Epon 828 resin and the cured product had no significantly different properties from that obtained with Epon 828.

EXAMPLE 8

Using 18.6 parts of the liquid mixed curing agent of Example 2 (anthranilic acid and metaphenylenediamine, in equal parts), 100 parts of the same Epon 828 resin were cured in each of different runs at temperatures of 100 C., 150° C. and 200° C., the respective times for full cure being 2 hours, 15 minutes and 5 minutes. The products obtained at any one temperature were in all respects comparable to those made with the curing agent of Example 1.

EXAMPLE 9

Cures of the Epon 828 resin were effected at 100° C. with each of a series of mixed curing agents prepared respectively with eight different aromatic amines and with 2-aminobenzenethiol and anthranilic acid as the respective amphoteric substances. The aromatic amines used were ortho, meta and paraphenylenediamine, ortho tolidine, dianisidine, metatolylenediamine, aniline, and $p,p_1$-methylenedianiline. Each amine was mixed with each amphoteric substance in each of three proportions, viz., 90–10, 50–50 and 10–90, for a total of 48 cases. The two components in each case were melted together to permit solvation, and the resulting mixture was cooled to room temperature. In all cases, at room temperature the mixture was either a true liquid, a slurry or paste, or a solid which melted at a temperature very substantially below the melting point of the higher melting component and well within the range of convenient working temperatures, not over about 125° C.

The Epon 828 resin being a somewhat viscous (syrupy) liquid at room temperature, it was added to the mixed curing agent in the cases where the latter was a liquid; otherwise, the resin was heated to liquefy it and thereby increase its solvation power and the more viscous or solid mixed curing agent was added to it. The whole mass was then heated as needed to yield a liquid mixture which was placed in the oven for the cure. The amount of mixed curing agent used in each case was substantially stoichiometric in relation to the amount of resin used. No significant difference was found among these diverse aromatic amines in so far as concerns the cured product, with the exception that with 2-aminobenzenethiol and aniline (a monoamine) the 90–10 and 10–90 mixtures gave a product that was slightly brittle, although hard, and the same occurred with anthranilic acid and aniline in the mixture having 90% of aniline. Curing times were longer with the mixtures containing aniline. The product in all cases was superior to that obtained when the Epon 828 resin was cured at the same temperature with either the same amine alone or the same amphoteric substance alone, in stoichiometric amount.

EXAMPLE 10

18 parts of the mixture of Example 3 (nicotinic acid and metaphenylene-diamine) were used as before to cure 100 parts of the Epon 828 resin at 100° C., this being substantially the stoichiometric proportion. The cure was effected in from 15 to 30 minutes, yielding a hard and tough resin comparable in quality with that obtained with the amphoteric substances of the other examples. Used alone as a curing agent, in stoichiometric amount, nicotinic acid presented difficulties in preparation due to its high melting point (235° C.). While it could be liquefied, it solidified too quickly upon removal of the heat to permit weighing out a portion for use and admixture with the resin. The best procedure found was to disperse it thoroughly as a powdered solid in the somewhat viscous resin (Epon 828) and then heat the mixture in the oven until cured. The cured product was poor, being frangible and "spongy" in the sense of having many voids and of yielding to slowly applied pressure. It lacked the hardness, toughness and uniformity of structure of the product cured with the mixture of nicotinic acid with the aromatic amine.

Process

We have described above how the solvated association product of mixing certain aromatic amines with certain aromatic amphoteric substances provides a mixed curing agent having advantages in convenience of preparation and use, in dispersability in the resin, and in effectiveness in the cure of certain epoxide resins. The above described class of amphoteric substances is thereby made more effective in the cure of such resins than when used alone, as shown both by the superiority of the cured product and by the fact that in some instances (e.g., nicotinic acid) amphoteric substances are made useful which are not practicable, when used alone, because of their high melting point.

The foregoing description of this effect was in terms of the amphoteric substances and the non-amphoteric aromatic amines that are useful in curing certain epoxide resins to produce our improved thermosetting resin.

A substantial upgrading in curing effectiveness is obtained with a broader class of amphoteric organic substances, and can be effected by a broader class of amines, as described in what follows, although without obtaining in all cases a thermosetting product superior to that obtainable with known cures.

Thus, many hetero-polyfunctional amphoteric organic substances, both aliphatic and aromatic, which melt only with decomposition can not be used alone as epoxide curing agents, both because of the difficulty of mixing them with the resin in a way to get a thorough and fluid dispersion and because of the unfavorable orientation of the complexes which their molecules form. Yet these amphoteric substances intrinsically have a potential effectiveness as epoxide curing agents because of the capability of their functional groups to react with epoxy groups. The inhibiting factors which in whole or in part prevent this potential effectiveness from being realized are at least substantially removed by our process of mixing the amphoteric substance with a non-amphoteric aromatic amine to form a mixed curing agent. The process thus is one for increasing the effective functionality of these amphoteric substances as epoxide curing agents, and in its broader aspect embraces both what has been described above and the further classes of material described below.

The hetero-polyfunctional amphoteric substances to which our process is applicable, in this broad aspect, include not only those aromatic substances already described which melt without decomposition but also amphoteric substances, both aromatic and aliphatic, which melt only with decomposition, together with aliphatic substances that melt without decomposition. For practical purposes, the useful class of such substances is limited to those having an equivalent weight less than about 250. Its general formula is A—R—B, wherein R is an organic substance, either aromatic or aliphatic, having from 1 to 18 carbon atoms in its chain or ring structure proper, exclusive of carbon atoms in its functional groups or in its substituents. In this general formula, A is an acidic group, either thio, carboxyl, or sulfonic ($—SO_3H$), and is attached to a ring or chain carbon either directly or through an alkyl group having from 1 to 3 carbons. B is a basic center or group, and consists of a nitrogen atom in the chain or ring structure, or an amino group attached directly to a chain or ring carbon and forming either a side chain or a bridge between ring structures. The amino group, like group X above, is either $NH_2$, $NR_1H$, or $N$, $R_2$, $R_3$, wherein $R_1$, $R_2$ and $R_3$ may be the same or different lower alkyl groups having from 1 to 5 carbon atoms.

Supplementing the examples given above of aromatic amphoteric substances, we cite the following amino acids, sulfonic acids, and derivatives of aromatic compounds as representative examples of the wider class of organic amphoteric substances which our invention makes effective or more effective as epoxide curing agents.

Glycine
Aminocinammic acid (o, m and p)
Beta alanine
Sulfanilic acid
Metanilic acid
o-Naphthionic acid
Toluidine sulfonic acid
7-amino-1,3,6-naphthalene trisulfonic acid
1-amino-2-naphthol-4-sulfonic acid
1-naphthylamine-3,8-disulfonic acid
Aniline-2,5-disulfonic acid
4,4'-diaminostilbene-2,2'-disulfonic acid
Ortic acid
Benzalanthranilic acid The organic non-amphoteric amino substances which are useful in our process, and in the mixed curing agent, are the primary, secondary and tertiary aromatic amines having a molecular weight up to about 250 and containing not more than 18 carbon atoms in the ring structure or nucleus itself. The compounds having more than 5 to 8 carbons in the ring are those having fused or linked or bridged rings, and comprise the various known forms of condensed amino compounds where the ring structure includes either more than one carbon (benzene) ring structure or a carbon ring fused with a heterocyclic ring, or more than one of either type of ring, all as in the description above of the more limited class of primary and secondary aromatic amines useful in preparing our improved thermosetting product.

Inasmuch as our process is one which makes these amphoteric substances effective, or more effective, in reaction with epoxy groups of the resin, the process in its broader aspect is not limited to the particular type of epoxide resin described above as useful in making our improved thermosetting product. In that type of resin, (the condensation or polyether product of an epihalogenhydrin with a polyhydric phenol or a polyhydric alcohol) the molecule may for example include one or more phenolic groups connected by an ether linkage. As is well known, however, the polymerization made possible by the presence of epoxy groups in the monomeric substance is not dependent upon or limited to the presence of phenolic groups, and polymerization proceeds when the compound contains other groups separating the epoxy groups. The particular properties of the cured polymeric product depend of course upon the whole make-up of the starting substance, but the reaction involving the curing agent and the epoxy groups is independent of the remaining fragment of the monomeric material provided that that fragment contains no interfering functional centers or groups and that it separates the epoxy groups by more than 5 saturated atoms, whatever those atoms may be.

Polymerizable epoxide resins are known which even contain ethylenic groups, and procedures are known by which the addition polymerization made possible by ethylenic groups and the "coupling" made possible by epoxy groups are effected separately without interference with each other. (Cf. Shokal U.S.P. 2,464,753.) Other epoxides contain fluorine groups, and many contain functional hydroxy groups, but these do not interfere with the reaction of the curing agent with the epoxy groups.

Our process and mixed curing agent are therefore useful in curing any polymerizable material having as an average an epoxy equivalence greater than 1.0, that is, any such substance which has a predominant proportion of a compound containing more than one epoxy group per molecule, which has more than five saturated atoms between the epoxy groups, and which is free of interfering functional groups. The epoxy groups may or may not be in terminal position. The epoxy equivalence is expressed by a number which is not an integer when, for example, the material also contains some monoepoxide, as often occurs.

When our mixed curing agent is prepared from an amphoteric substance that does not melt without decomposition, we use an aromatic non-amphoteric amine that is either a liquid or that melts without decomposition. Upon admixture of the two, with the non-amphoteric substance in liquid or liquefied state, there is a solvation effect and the resulting product when cooled to room temperature is either a syrup, a paste or a solid which can be reduced to a liquid, a syrup or a paste by heating to a temperature short of decomposition. We thereby obtain a mixed curing agent which can be mixed with the liquid or liquefied epoxide resin to give a reaction mass that is at least fluid if not liquid at the curing temperature. The reactants are thus more intimately and more uniformly mixed than if the amphoteric substance were used alone, since such sole use would require admixture of the amphoteric substance in a solid or more viscous state with the resin, and the curing agent would be imperfectly dispersed in the reaction mass. With the mixed curing agent, which is a solvated association product of the amphoteric substance with the non-amphoteric aromatic amine, the reaction mass at curing temperature is relatively fluid, a condition which favors more nearly complete reaction, more uniform polymerization and better release of gases.

Conversely, where the non-amphoteric aromatic amine does not melt without decomposition, we use it only with amphoteric substances which melt without decomposition.

In the case of these amphoteric substances which do not melt without decomposition, we prefer that the proportion of non-amphoteric aromatic amine in the mixture be from about 40% to about 70% by weight. In such mixtures, the effect of the aromatic amine is sufficient to remove in substantial degree the factors of solidity and unfavorable orientation which inhibit the potential functionality of the amphoteric substance as a curing agent. The amphoteric substance then becomes effective as a curing agent, or substantially more effective in those cases where it is capable of some effect when used alone.

Representative amphoteric substances which do not melt without substantial decomposition are sulfanilic acid (an aromatic) and the aliphatic amino acids, beta alanine and glycine. All three are so-called zwitterion or dipolar compounds forming inner salts. Sulfanilic acid is a borderline example in that it can be heated sufficiently, without decomposition, to soften it very considerably and to a state in which, when mixed with an aromatic amine that melts without decomposition, it forms a mixture that is relatively fluid at 100° C. or thereabout. It has some substantial effect as an epoxide curing agent when used alone, but is given a much greater effect when mixed with an aromatic amine, the effect being even greater when the amine is of low melting point and is a diamine. Beta alanine and glycine exemplify materials which can be softened but little by heating, if substantial decomposition is to be avoided, and which are neither practicable nor substantially effective as epoxide curing agents when used alone. However, when mixed with approximately an equal weight or more of an aromatic amine which melts without decomposition, they form a mixed curing agent which generally is pasty at room temperature, which can be heated without decomposition to a condition of such reduced viscosity that it can be dispersed reasonably well in the resin, and which has a substantial curing effect.

A series of mixed curing agents were prepared in the manner described, using either a liquid aromatic non-amphoteric amine or else a solid one in melted condition, by mixing with it the amphoteric substance in solid or in softened form, to produce in each case a product which was either a paste or a solid when cooled to room temperature but which, without decomposition, could be heated enough to lower its viscosity substantially and permit it to be dispersed in the resin. Heating to not over about 100° C. was used for this purpose. Three amphoteric substances were used, viz., sulfanilic acid, beta alanine and glycine. Each was mixed with each of seven aromatic amines, in each of three proportions, for a total of 63 different mixtures. The non-amphoteric amines were aniline, the three phenylenediamines (o, m and p), dianisidine, metatolylenediamine and o-tolidine. The weight proportions of non-amphoteric amine to amphoteric substance were 10-90, 50-50 and 90-10 respectively.

Each of these several mixtures was then used in an oven cure or attempted cure of an epoxide resin, Epon 828 as above, at 100° C., the proportion of mixed curing agent to resin being stoichiometric. Observations were made of their relative efficacy as curing agents by noting the character of the product obtained. Each run was continued until it was evident that polymerization had ceased. No catalyst, accelerator, regulator, filler or other modifier was used.

In the runs using the mixtures having 10% of the amine, none of the mixtures cured the resin to a hard and tough product. Of the three amphoteric substances used in this series, sulfanilic acid alone showed any effectiveness as a curing agent, doing so however only with meta and ortho phenylenediamine and with aniline. Even in those three instances, the cure was incomplete after 12 hours and the product was markedly brittle when cooled. This is in striking contrast to the effect obtainable at the same curing temperature with a mixed curing agent such as is produced when 10 parts of any of these aromatic amines are used with 90 parts of 2-aminobenzenethiol. Such a curing agent cured the Epon 828 resin to a hard and tough product in 2 hours at 100° C., without difference as among the mixtures with the different amines, except that the product obtained with the mixture containing aniline (a monoamine) was slightly brittle. From this, it is evident that none of these three amphoteric substances is alone a useful epoxide curing agent.

The series of cures with the mixtures containing 50% of one or another of the several aromatic amines identified above showed a definite improvement, justifying the conclusion that when the aromatic amine and the amphoteric substance are in approximately equal proportion by weight, the association product is a curing agent of substantial effect and that the effective functionality of the amphoteric substance is increased by its association with the aromatic amine in a solvated product. Thus, in the series of cures with the 50-50 mixtures, some degree of cure was effected in all cases, and in some a hard and tough product was made. The cure was incomplete in other instances.

The 50-50 mixture with glycine gave an incomplete cure with all of the several amines except m-tolylenediamine and meta and para phenylenediamine. With those three amines it gave a full cure to a hard but slightly brittle thermoset product; whereas it gave no cure in any case in the mixture in which it formed 90% and the amine, 10%.

Beta alanine gave an incomplete cure with aniline, o-phenylenediamine and o-tolidine in the 50-50 mixture; and gave a full cure to a hard thermoset product with meta and para phenylenediamine, dianisidine and m-tolylenediamine. This product was slightly brittle with all except p-phenylenediamine, which in this 50-50 mixture yielded a hard and tough product. This showed an increased efficacy of beta alanine as compared with its use with 10% of the amine, where it failed to effect any cure with any of the seven amines except aniline, with which it gave only an incomplete cure.

Sulfanilic acid in admixture with an equal amount of the amine gave a full cure to a hard and tough thermoset resin with two of the amines, viz., meta and para phenylenediamine. It gave a complete cure, but a more brittle product, with dianisidine, m-tolylenediamine and orthophenylenediamine. It gave an incomple cure with aniline and ortho tolidine. Thus, sulfanilic acid, which showed some efficacy when admixed with 10% of an aromatic amine, was increased in efficacy when in association with an equal weight of the amine; and in two instances, as was the case with beta alanine in one instance, the improvement was sufficient to yield a hard and tough product.

In the series of cures using the above described mixtures with 90% of the non-amphoteric amine and 10% of the amphoteric compound, it was evident that the amine so dominated as to make the effect of the amphoteric compound insignificant.

Our process and mixed curing agent, in their broadest aspect, therefore do not in all cases result in a cure of the resin to a superior hard and tough thermosetting product; but with sufficient of the aromatic amine present they possess utility in all cases in making the amphoteric substance effective in some degree, and materially more effective in those instances where it has some efficacy alone, as a curing agent for an epoxide. That the amphoteric substance effectively participated in the cure, in those instances where it constituted about half of the mixture with the non-amphoteric substance, is shown by the fact that either no cure or a substantially inferior cure of the same amount of resin could be effected by the use alone of an amount of the non-amphoteric amino substance equal to that present in association with the amphoteric material.

We claim:

1. A curing agent for an epoxide resin comprising a solvated association product of (a) at least one compound selected from the class consisting of heteropolyfunctional aromatic amphoteric substances which melts without decomposition, said amphoteric substance being composed of at least one compound selected from the class having the formula X—R—Y, wherein R is an aromatic nucleus having up to and including 18 cyclically included carbon atoms; Y is at least one functional acidic group having the general formula CA, where C is an alkyl group having from 0 to 3 carbon atoms and A is selected only from the group consisting of sulphydril and carboxy groups, said acidic group being attached to a cyclically included carbon; and X is at least one functional basic group selected from the class consisting of heterocyclic nitrogen atoms and nucleus-attached basic amino groups selected from the class consisting of $NH_2$, $NHR_1$ and $NR_2R_3$ in which $R_1$, $R_2$ and $R_3$ are selected from the group consisting of the lower alkyls having from 1 to 5 carbon atoms, and (b) at least one compound selected from the class consisting of non-amphoteric aromatic primary and secondary amines, the content of material from each of said classes being from 10%-90% of said product to yield a curing agent fluid at practical curing temperatures.

2. The cured product of the curing agent of claim 1 and an epoxide resin which has a 1, 2 epoxy equivalency of at least 1.4 and which comprises a polyether of a polyhydric organic compound containing epoxy groups, the polyhydric organic compound being selected from the class consisting of polyhydric alcohols and polyhydric phenols having at least two phenolic hydroxy groups, the curing agent having been added in an amount from about 80 to 105% of the hydrogen equivalent per epoxy group.

3. A curing agent as in claim 1 in which the said non-amphoteric aromatic primary and secondary amine material and the said hetero-polyfunctional aromatic amphoteric compounds have an equivalent weight not exceeding about 250.

4. The cured product of the three materials described in parts a, b and c of claim 11, where the content of material described in part b and the content of material described in part c are each from about 25% to about 75% of the total of both together; and the curing agent b and c having been added in an amount from about 80 to 105% of the hydrogen equivalent per epoxy group.

5. A curing agent for an epoxide resin fluid at practical curing temperatures comprising the solvated association product of 2-amino-benzenethiol and at least one compound selected from the class of non-amphoteric primary and secondary aromatic amines which melt without decomposition, the content of 2-amino-benzenethiol in said product being from about 25% to about 75%.

6. A curing agent for an epoxide resin fluid at practical curing temperatures comprising the solvated association product of anthranilic acid and at least one compound selected from the class of non-amphoteric primary and secondary aromatic amines which melt without decomposition, the content of anthranilic acid in said product being from about 25% to about 75%.

7. A curing agent for an epoxide resin fluid at practical curing temperatures comprising the solvated association product of nicotinic acid and at least one compound selected from the class of non-amphoteric primary and secondary aromatic amines which melt without decomposition, the content of nicotinic acid in said product being from about 25% to about 75%.

8. The cured product of the curing agent of claim 5 and an epoxide resin which has a 1, 2 epoxy equivalency of at least 1.4 and which comprises a polyether of a polyhydric organic compound containing epoxy groups, the polyhydric organic compound being selected from the class consisting of polyhydric alcohols and polyhydric phenols having at least two phenolic hydroxy groups; the curing agent having been added in a substantially hydrogen equivalent amount per epoxy group.

9. The cured product of the curing agent of claim 6 and an epoxide resin which has a 1, 2 epoxy equivalency of at least 1.4 and which comprises a polyether of a polyhydric organic compound containing epoxy groups, the polyhydric organic compound being selected from the class consisting of polyhydric alcohols and polyhydric phenols having at least two phenolic hydroxy groups; the curing agent having been added in a substantially hydrogen equivalent amount per epoxy group.

10. The cured product of the curing agent of claim 7 and an epoxide resin which has a 1, 2 epoxy equivalency of at least 1.4 and which comprises a polyether of a polyhydric organic compound containing epoxy groups, the polyhydric organic compound being selected from the class consisting of polyhydric alcohols and polyhydric phenols having at least two phenolic hydroxy groups; the curing agent having been added in a substantially hydrogen equivalent amount per epoxy group.

11. The cured product of (a) an epoxide resin which has a 1, 2 epoxy equivalency of at least 1.4 and which comprises a polyether of a polyhydric organic compound containing epoxy groups, the polyhydric organic compound being selected from the class consisting of polyhydric alcohols and polyhydric phenols having at least two phenol hydroxy groups; (b) at least one substance selected from the class consisting of non-amphoteric primary and secondary aromatic amines which melt without decomposition, and (c) at least one aromatic heteropolyfunctional amphoteric compound which melts without decomposition and which have the formula X—R—Y, wherein R is an aromatic nucleus having up to and including 18 cyclically included carbon atoms; Y is at least one functional acidic group having the general formula CA, where C is an alkyl group having from 0 to 3 carbon atoms and A is selected only from the group consisting of sulphydril and carboxy groups, said acidic group being attached to a cyclically included carbon, and X is at least one functional basic group selected from the class consisting of heterocyclic nitrogen atoms and nucleus-attached basic amino groups selected from the class consisting of $NH_2$, $NHR_1$ and $NR_2R_3$ in which $R_1$, $R_2$ and $R_3$ are selected from the group consisting of the lower alkyls having from 1 to 5 carbon atoms; the solvated association product of (b) and (c) being fluid at practical curing temperatures.

12. The process of increasing the effective functionality, as a curing agent for epoxide resins, of a heteropolyfunctional organic compound which has the formula X—R—Y, wherein R is a nucleus selected from the class consisting of an aliphatic nucleus having from 1 to 18 carbon atoms and an aromatic nucleus having up to and including 18 cyclically included carbon atoms, Y is at least one functional acidic group having the general formula CA, where C is an alkyl group having from 0 to 3 carbon atoms and A is selected only from the group consisting of sulphydril, sulfonic, and carboxy groups, in the case of the aromatic nucleus said acidic group being attached to a cyclically included carbon and X is at least one basic functional group selected from the class of heterocyclic nitrogen atoms and nucleus-attached basic amino groups selected from the class consisting of $NH_2$, $NHR_1$, $NR_2R_3$, in which $R_1$, $R_2$ and $R_3$ are selected from the group consisting of the lower alkyls having from 1 to 5 carbon atoms; which comprises forming a solvated association product of said amphoteric compound and a non-amphoteric aromatic amine selected from the class of primary, secondary and tertiary amines, at least one of the said two associated materials having a melting point below its decomposition point, the content of the non-amphoteric aromatic amine being from about 40% to about 70% by weight to yield a curing agent fluid at practical curing temperatures.

13. A composition comprising the solvated association product of claim 1 and an epoxide resin which has a 1, 2 epoxy equivalency of at least 1.4 and which comprises a polyether of a polyhydric organic compound containing epoxy groups, the polyhydric organic compound being selected from the class consisting of polyhydric alcohols and polyhydric phenols having at least two phenolic hydroxy groups, the curing agent having been added in an amount of about 80 to 105% of the hydrogen equivalent per epoxy group.

14. A composition comprising the solvated association product of claim 1 and an epoxide resin which has a 1, 2 epoxy equivalency of at least 1.4 and which comprises a polyether of a polyhydric organic compound containing epoxy groups, the polyhydric organic compound being selected from the class consisting of polyhydric alcohols and polyhydric phenols having at least two phenolic hydroxy groups, the curing agent having been added in an amount from about 80 to 105% of the hydrogen equivalent per epoxy group.

15. A composition comprising (a) an epoxide resin which has a 1, 2 epoxy equivalency of at least 1.4 and which comprises a polyether of a polyhydric organic compound containing epoxy groups, the polyhydric organic compound being selected from the class consisting of polyhydric alcohols and polyhydric phenols having at least two phenolic hydroxy groups; (b) at least one substance selected from the class consisting of non-amphoteric primary and secondary aromatic amines which melts without decomposition, and (c) at least one aromatic heteropolyfunctional amphoteric compound which melts without decomposition and which has the formula X—R—Y, wherein R is an aromatic nucleus having up to and including 18 cyclically included carbon atoms, Y is at least one functional acidic group having the general formula CA, where C is an alkyl group having from 0 to 3 carbon atoms and A is selected only from the group consisting of sulphydril and carboxy groups, said acidic group being attached to a cyclically included carbon, and X is at least one functional basic group selected from the class consisting of heterocyclic nitrogen atoms and nucleus-attached basic amino groups and selected in turn from the class consisting of $NH_2$, $NHR_1$ and $NR_2R_3$ in which $R_1$, $R_2$ and $R_3$ are selected from the group consisting of the lower alkyl groups having from 1 to 5 carbon atoms and wherein the content of material from each of said (b) and (c) is from 10 to 90% of the total of (b) and (c) and wherein a solvated association product of (b) and (c) is fluid at practical curing temperatures.

16. The product of the three materials described in parts a, b and c of claim 15, where the content of material described in part b and the content of material described in part c are each from about 25% to about 75% of the total of both together, and where the amount of (b) and (c) added is from about 80 to 105% of the hydrogen equivalent per epoxy group.

17. A composition comprising the curing agent of claim 5 and an epoxide resin which has a 1, 2 epoxy equivalency of at least 1.4 and which comprises a polyether of a polyhydric organic compound containing epoxy groups, the polyhydric organic compound being selected from the class consisting of polyhydric alcohols and polyhydric phenols having at least two phenolic hydroxy groups, the curing agent having been added in a substantially hydrogen equivalent amount per epoxy group.

18. A composition comprising the curing agent of claim 6 and an epoxide resin which has a 1, 2 epoxy equivalency of at least 1.4 and which comprises a polyether of a polyhydric organic compound containing epoxy groups, the polyhydric organic compound being selected from the class consisting of polyhydric alcohols and polyhydric phenols having at least two phenolic hydroxy groups, the curing agent having been added in a substantially hydrogen equivalent amount per epoxy group.

19. A composition comprising the curing agent of claim 7 and an epoxide resin which has a 1,2 epoxy equivalency of at least 1.4 and which comprises a polyether of a polyhydric organic compound containing epoxy groups, the polyhydric organic compound being selected from the class consisting of polyhydric alcohols and polyhydric phenols having at least two phenolic hydroxy groups, the curing agent having been added in a substantially hydrogen equivalent amount per epoxy group.

References Cited in the file of this patent

UNITED STATES PATENTS

| | | |
|---|---|---|
| 2,654,679 | Goppel et al. | Oct. 6, 1953 |
| 2,753,323 | Farnham | Mar. 30, 1953 |
| 2,801,229 | De Hoff et al. | July 30, 1957 |

FOREIGN PATENTS

| | | |
|---|---|---|
| 704,316 | Great Britain | Sept. 19, 1952 |